(12) United States Patent
Bretschneider et al.

(10) Patent No.: US 11,391,438 B2
(45) Date of Patent: Jul. 19, 2022

(54) LUMINAIRE WITH HOLLOW OPTICAL SYSTEMS

(71) Applicant: Quarkstar LLC, Las Vegas, NV (US)

(72) Inventors: Eric Bretschneider, Corinth, TX (US); Louis Lerman, Las Vegas, NV (US); Ferdinand Schinagl, North Vancouver (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 17/282,366

(22) PCT Filed: Sep. 27, 2019

(86) PCT No.: PCT/US2019/053675
§ 371 (c)(1),
(2) Date: Apr. 1, 2021

(87) PCT Pub. No.: WO2020/072331
PCT Pub. Date: Apr. 9, 2020

(65) Prior Publication Data
US 2021/0341129 A1    Nov. 4, 2021

Related U.S. Application Data

(60) Provisional application No. 62/749,044, filed on Oct. 22, 2018, provisional application No. 62/741,498, filed on Oct. 4, 2018.

(51) Int. Cl.
*F21V 7/09*    (2006.01)
*F21S 6/00*    (2006.01)
(Continued)

(52) U.S. Cl.
CPC ............... *F21V 7/09* (2013.01); *F21S 6/007* (2013.01); *F21S 8/06* (2013.01); *F21V 7/0008* (2013.01);
(Continued)

(58) Field of Classification Search
CPC ........ F21V 7/09; F21V 7/0008; F21V 7/0033; F21S 6/007; G02B 6/0096; F21Y 2103/30
See application file for complete search history.

(56) References Cited

U.S. PATENT DOCUMENTS

2005/0255726 A1    11/2005  Long
2009/0168395 A1     7/2009  Mrakovich et al.
(Continued)

FOREIGN PATENT DOCUMENTS

DE        29608632 U1     8/1996
DE     102013211868 A1   12/2014
(Continued)

OTHER PUBLICATIONS

International Application No. PCT/US2019/053675, Notification of Transmittal of the International Search Report and the Written Opinion of the International Searching Authority, dated Nov. 29, 2019, 17 pages.

*Primary Examiner* — Evan P Dzierzynski
(74) *Attorney, Agent, or Firm* — Fish & Richardson P.C.

(57) ABSTRACT

A luminaire (100) includes a base (102) supporting multiple light-emitting elements (LEEs) (122); and a first wall (150-*i*) and a second wall (150-*o*) each extending along a first direction (101). The first and second walls (150-*i*, 150-*o*) have light-reflective surfaces facing each other and forming a hollow channel (152). The light-reflective surfaces have first portions (120) that curve in opposite directions, second portions (130) that are parallel, and third portions (140) that curve in like directions. The first portions (120) are arranged facing the LEEs (110) to provide an input aperture (122) that receives light from the LEEs (110). The third portions (140) are arranged to provide an exit aperture (142) that outputs output light into an ambient environment. The first and
(Continued)

second walls (150-*i*, 150-*o*) are configured to propagate light from the input aperture (122) to the exit aperture (142).

24 Claims, 10 Drawing Sheets

(51) Int. Cl.
   | | | |
   |---|---|---|
   | *F21S 8/06* | (2006.01) | |
   | *F21V 7/00* | (2006.01) | |
   | *F21V 8/00* | (2006.01) | |
   | *F21Y 103/30* | (2016.01) | |
   | *F21Y 103/10* | (2016.01) | |
   | *F21Y 115/10* | (2016.01) | |

(52) U.S. Cl.
   CPC .......... *F21V 7/0033* (2013.01); *G02B 6/0096* (2013.01); *F21Y 2103/10* (2016.08); *F21Y 2103/30* (2016.08); *F21Y 2115/10* (2016.08)

(56) References Cited

U.S. PATENT DOCUMENTS

| | | |
|---|---|---|
| 2012/0250346 A1 | 10/2012 | Williams |
| 2013/0258652 A1 | 10/2013 | Hsieh et al. |
| 2014/0111736 A1 | 4/2014 | An et al. |
| 2016/0178139 A1 | 6/2016 | Ansems et al. |
| 2018/0106952 A1 | 4/2018 | York et al. |
| 2018/0196189 A1* | 7/2018 | Dau ...................... F21V 7/0025 |

FOREIGN PATENT DOCUMENTS

| | | | | |
|---|---|---|---|---|
| WO | WO-2016073878 A1 * | 5/2016 | ................. | F21S 8/00 |
| WO | WO-2017192795 A1 * | 11/2017 | ............ | F21V 7/0008 |
| WO | WO-2019140138 A1 * | 7/2019 | ............ | F21V 23/008 |

* cited by examiner

LUMINAIRE WITH HOLLOW OPTICAL SYSTEMS

FIELD OF TECHNOLOGY

The present technology relates to luminaires with optical systems based on specular reflective surfaces.

BACKGROUND

Luminaires with optical systems based on solid transparent materials offer great design opportunities for miniaturization and to shape light provided by point-like light sources. Perfect lossless reflection via TIR, however, imposes constraints on incidence angles and can affect overall system design which is irrelevant to conventional reflective systems provided certain performance penalties are acceptable and transparent optics are not required. As such there has been a long-felt need to mitigate this situation.

BRIEF DESCRIPTION OF FIGURES

Like symbols in different figures indicate like elements.

Figure 1A:
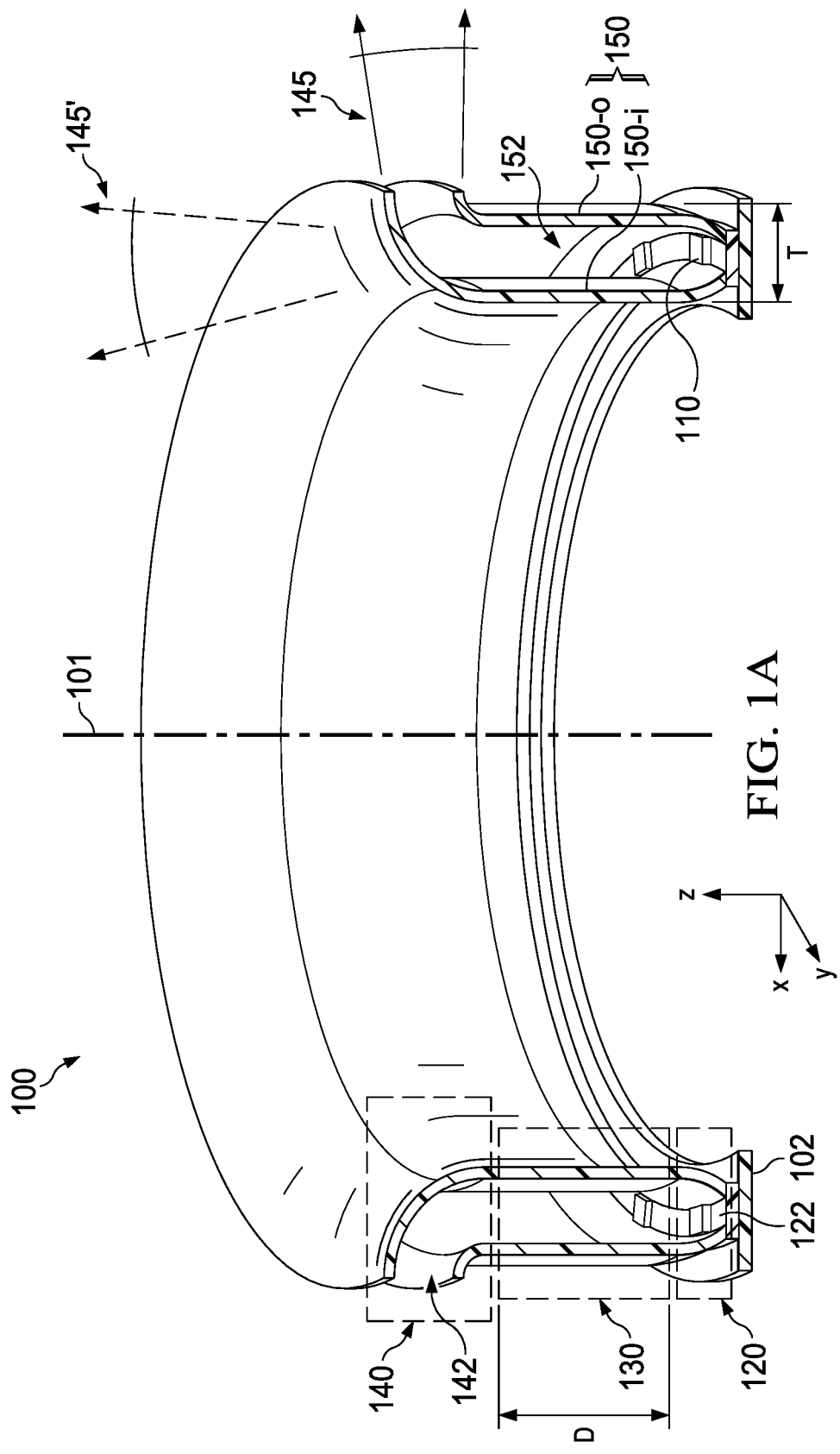
FIGS. 1A-1B show a curved hollow luminaire configured as a standing lamp, pedestal, or pendant for indirect illumination via ceiling or wall.

The details of one or more implementations of the technologies described herein are set forth in the accompanying drawings and the description below. Other features, aspects, and advantages of the disclosed technologies will become apparent from the description, the drawings, and the claims.

DETAILED DESCRIPTION OF THE TECHNOLOGY

This disclosure includes technologies directed to luminaires with optical systems based on reflective walls. The optical systems can include light guides, couplers, extractors, diffusers and so forth. Reflection at the reflective surfaces can be specular or partially diffuse. Luminaires with such optical systems are useful where opaque optics are admissible. Components of the optical system can be vacuum formed from suitable sheet material, milled from bulk stock or otherwise formed. Depending on the implementation, highly reflective surfaces may be provided by flat sheet material before forming or applied post forming such by sputtering or other processes. Compared to the requirements for processing solid optics, such manufacture can be easier and more cost effective. These technologies are described in detail below.

In a first innovative aspect (see, e.g., FIGS. 1A-1B, 2 or 7A-7B, 8), a hollow luminaire (100, 200 or 700, 800) includes multiple light-emitting elements (LEEs) (110 or 710); a base (102 or 702) supporting the LEEs (110 or 710); a first wall (150-*i* or 750-*i*) and a second wall (150-*o* or 750-*o*) each extending along a first direction (e.g., along axis 101 or 701) from a respective first end facing the LEEs (110 or 710) to a respective second end. The first and second walls (150-*i*, 150-*o* or 750-*i*, 750-*o*) have light-reflective surfaces facing each other. The light-reflective surfaces are spaced apart and form a hollow channel (152 or 752). In one or more cross-sectional planes parallel to the first direction (e.g., along axis 101 or 701), the light-reflective surfaces of the first and second walls (150-*i*, 150-*o* or 750-*i*, 750-*o*) have first portions (120 or 720) that curve in opposite directions, second portions (130 or 730) that are parallel, and third portions (140 or 740) that curve in like directions. The first portions (120 or 720) are arranged facing the LEEs (110 or 710) to provide an input aperture (122 or 722) that receives light from the LEEs (110 or 710). The third portions (140 or 740) are arranged to provide an exit aperture (142 or 742) that outputs output light into an ambient environment. Additionally, the first and second walls (150-*i*, 150-*o* or 750-*i*, 750-*o*) are configured to propagate light from the input aperture (122 or 722) to the exit aperture (142 or 742).

The foregoing and other embodiments can each optionally include one or more of the following features, alone or in combination. In some implementations, the first ends of the first and second walls (150-*i*, 150-*o* or 750-*i*, 750-*o*) are arranged proximate the LEEs (110 or 710).

In some implementations, a width (T) of the hollow channel (152 or 752) between the second portions (130 or 730) of the first and second walls (150-*i*, 150-*o* or 750-*i*, 750-*o*) is uniform.

Figure 1B:
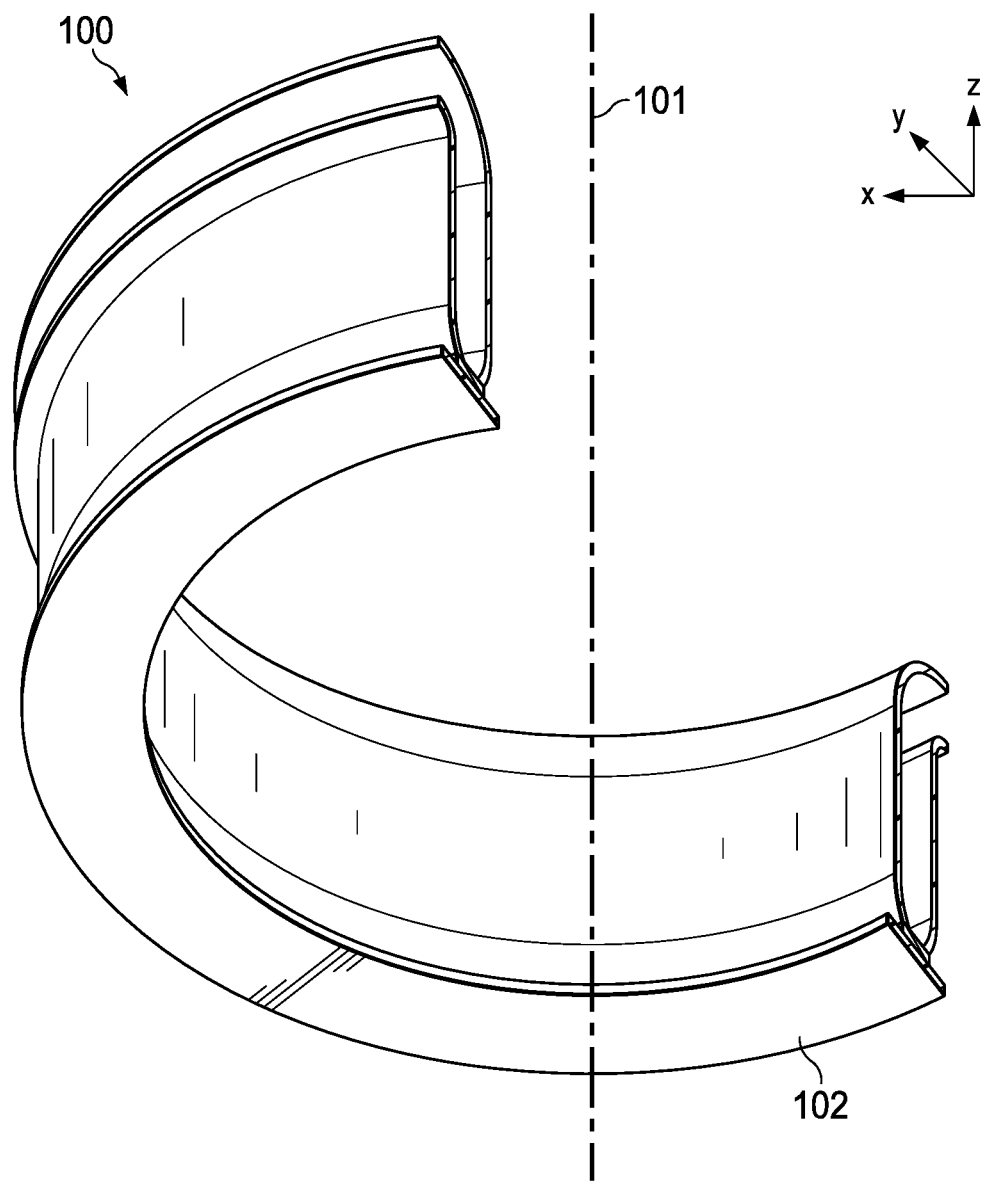

In implementations shown in FIGS. 1A-1B and/or 7A-7B, the first and second walls (150-*i*, 150-*o* or 750-*i*, 750-*o*) extend along a curvilinear path perpendicular to the first direction (i.e., axis 101 or 701). In implementations shown in FIGS. 2 and/or 8, the first and second walls (150-*i*, 150-*o* or 750-*i*, 750-*o*) extend along a line perpendicular to the first direction (i.e., axis 101 or 701). In some cases of the implementations shown in FIGS. 1A-1B and/or 7A-7B, when the first and second walls (150-*i*, 150-*o* or 750-*i*, 750-*o*) have closed tubular shapes, the first wall (150-*i* or 750-*i*) is nested within the second wall (150-*o* or 750-*o*) and arranged to provide a hollow channel (152 or 752) of uniform width (T).

Figure 2:
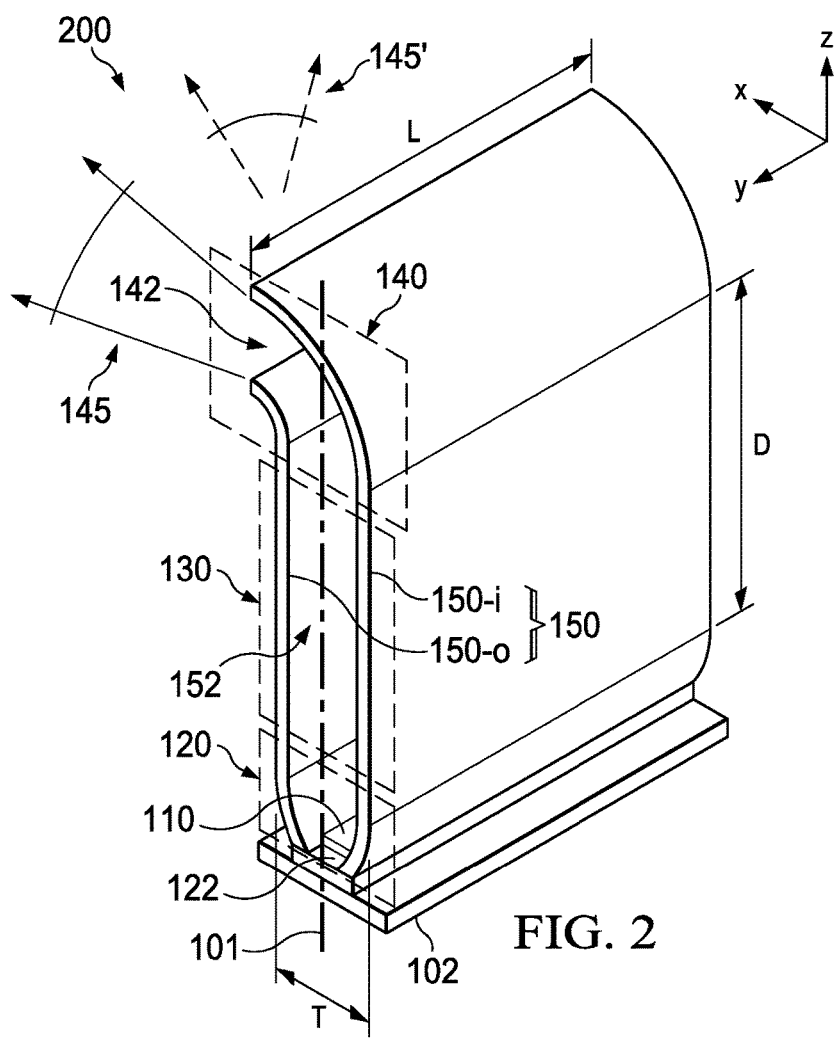
FIG. 2 shows a linear hollow luminaire configured as a standing lamp, pedestal, or pendant for indirect illumination via ceiling or wall.
Figure 3:
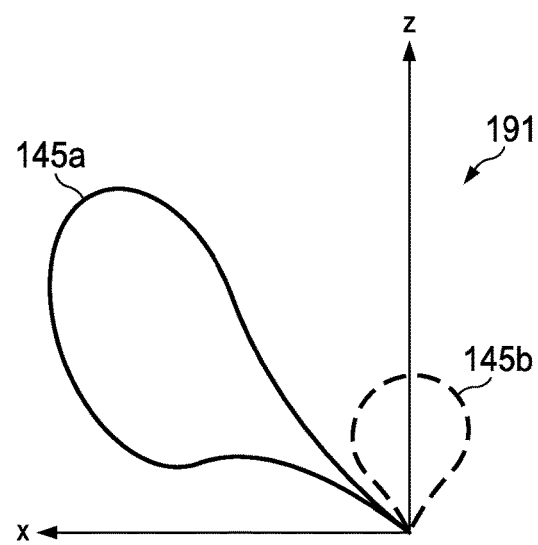
FIG. 3 shows a light intensity distribution for the hollow luminaires of FIGS. 1A-1B, 2.

The first and second walls (150-*i*, 150-*o* or 750-*i*, 750-*o*) are configured to rotate an angular distribution of light propagating from the input aperture (122 or 722) to the exit aperture (142 or 742). With reference to FIGS. 2 and 3, the angular distribution 145 of output light has a prevalent propagation direction that includes an acute angle with the propagation direction (here, parallel to the z-axis), as shown by the orientation of corresponding lobe 145*a* in polar plot 191. Optionally, a portion of the light propagating from the input aperture (122) to the exit aperture (142) leaks to the ambient environment through the curved third portion (140) of the first wall (150-*i*). The angular distribution 145' of leaked light has a prevalent propagation direction along the propagation direction, as shown by the orientation of corresponding lobe 145*b* in polar plot 191.

Figure 10:
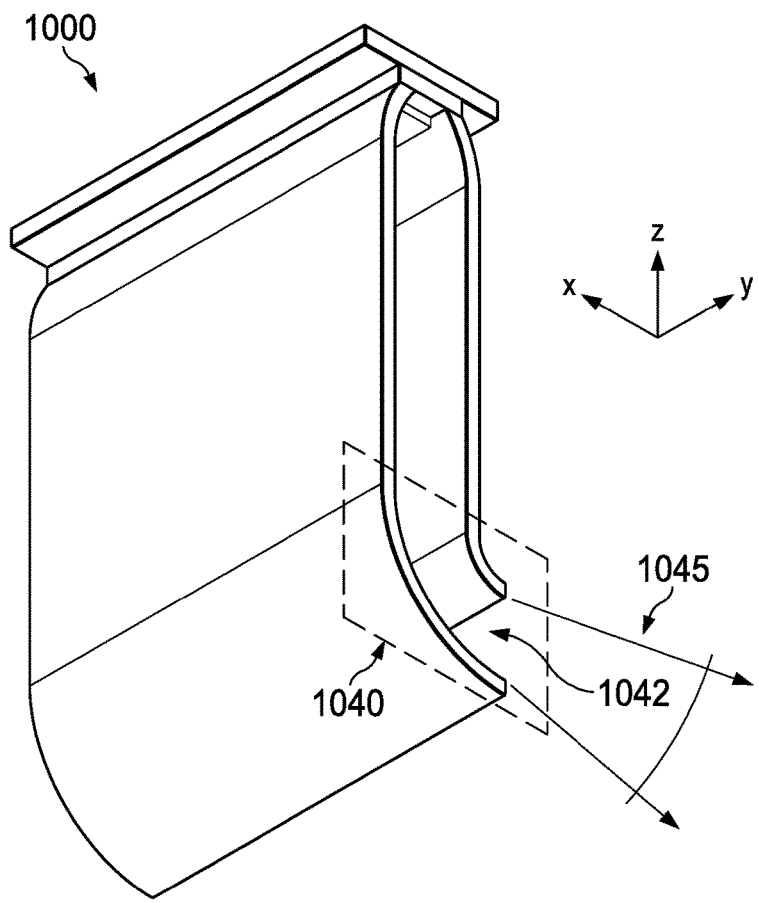
FIG. 10 shows a linear hollow luminaire configured as a wall wash.
Figure 11:
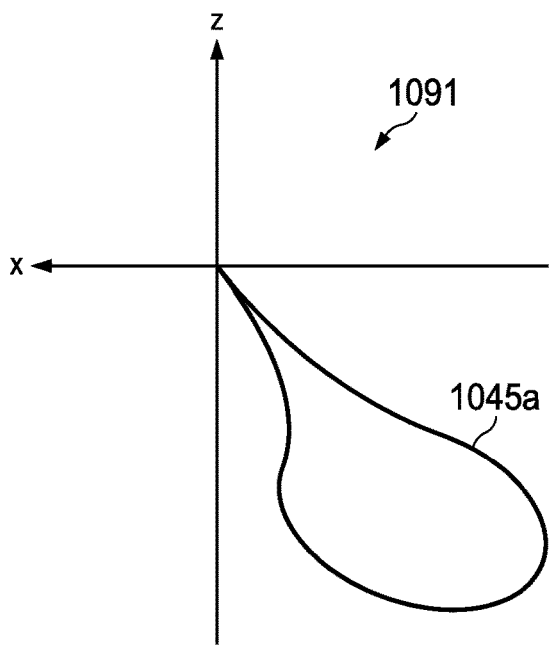
FIG. 11 shows a light intensity distribution for the hollow luminaire of FIG. 10.

As another example, with reference to FIGS. 10 and 11, the angular distribution 1045 of output light has a prevalent propagation direction that includes an acute angle with the propagation direction (here, antiparallel to the z-axis), as shown by the orientation of corresponding lobe 1045*a* in polar plot 1091.

Figure 8:
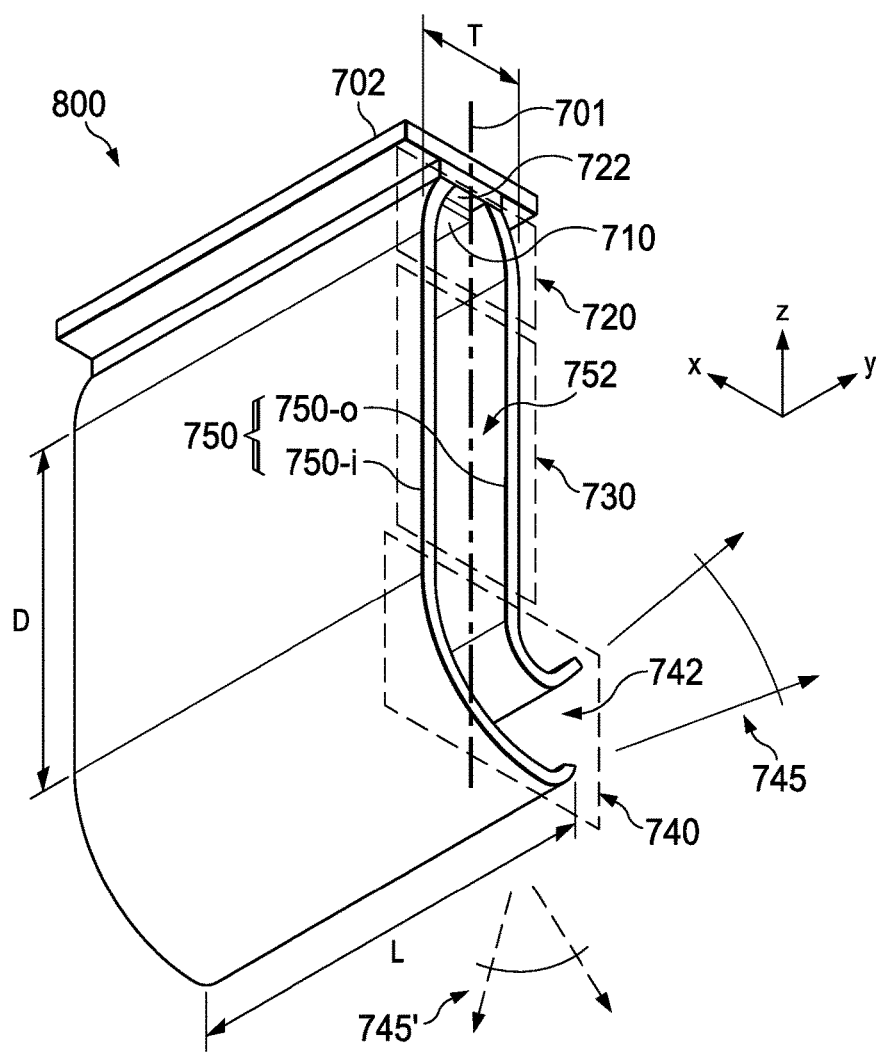
FIG. 8 shows a linear hollow luminaire configured as a pendant for direct/indirect illumination which can be ceiling mounted or partially recessed.
Figure 9:
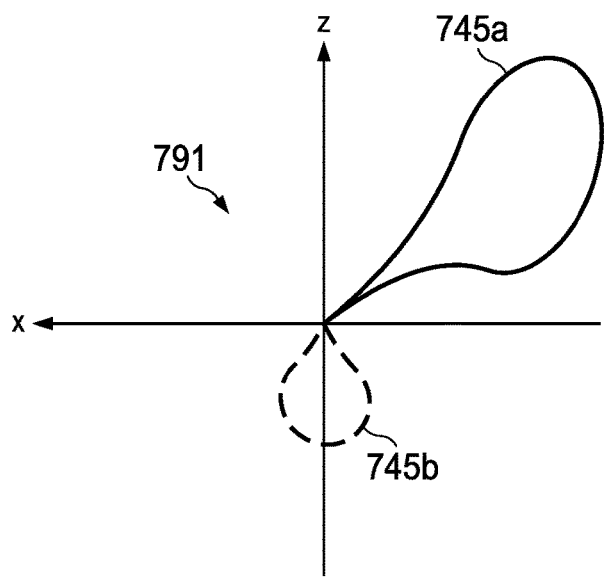
FIG. 9 shows a light intensity distribution for the hollow luminaires of FIGS. 7A-7B, 8.

With reference to FIGS. 8 and 9, the angular distribution 745 of output light has a prevalent propagation direction that includes an obtuse angle with the propagation direction (here, antiparallel to the z-axis), as shown by the orientation of corresponding lobe 745*a* in polar plot 791. Optionally, a portion of the light propagating from the input aperture (722) to the exit aperture (742) leaks to the ambient environment through the curved third portion (740) of the first wall (750-*i*). The angular distribution 745' of leaked light has a prevalent propagation direction along the propagation direction, as shown by the orientation of corresponding lobe 745*b* in polar plot 791.

Figure 4:
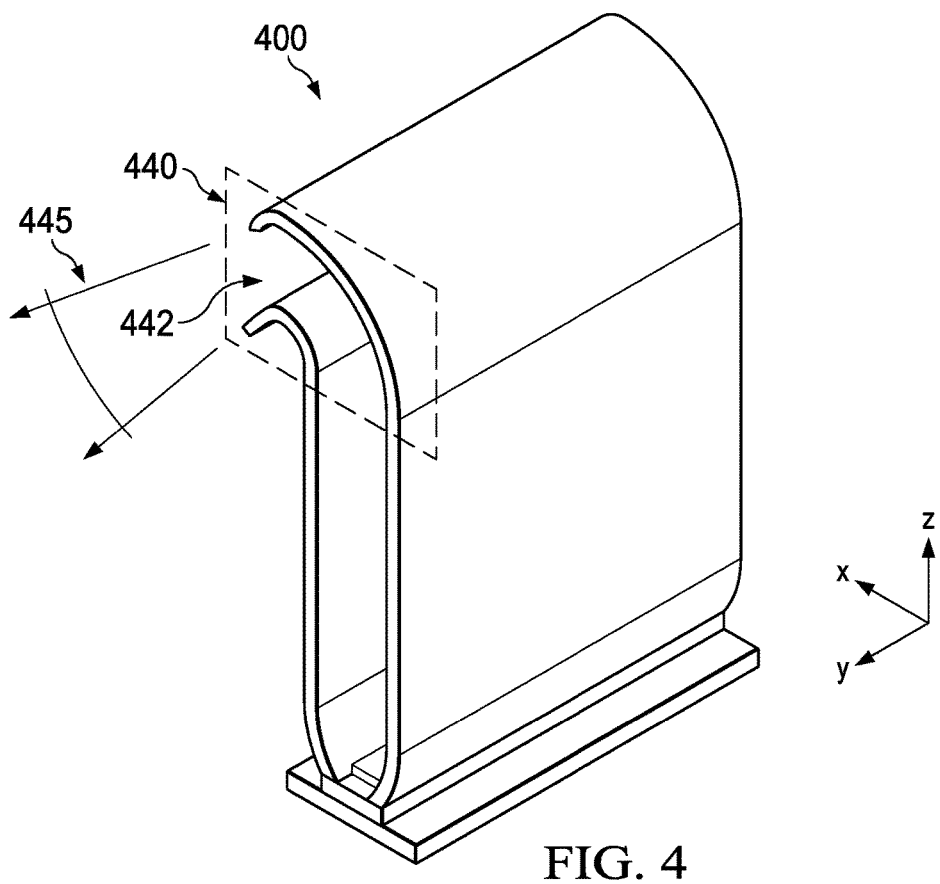
FIG. 4 shows a linear hollow luminaire configured as a stack light.
Figure 5:
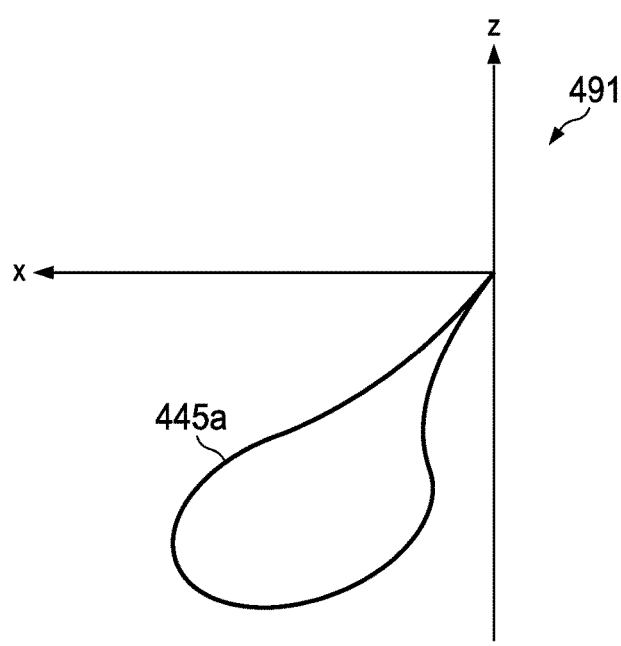
FIG. 5 shows a light intensity distribution for the hollow luminaire of FIG. 4.

As another example, with reference to FIGS. 4 and 5, the angular distribution 445 of output light has a prevalent propagation direction that includes an obtuse angle with the propagation direction (here, parallel to the z-axis), as shown by the orientation of corresponding lobe 445*a* in polar plot 491.

Figure 12:
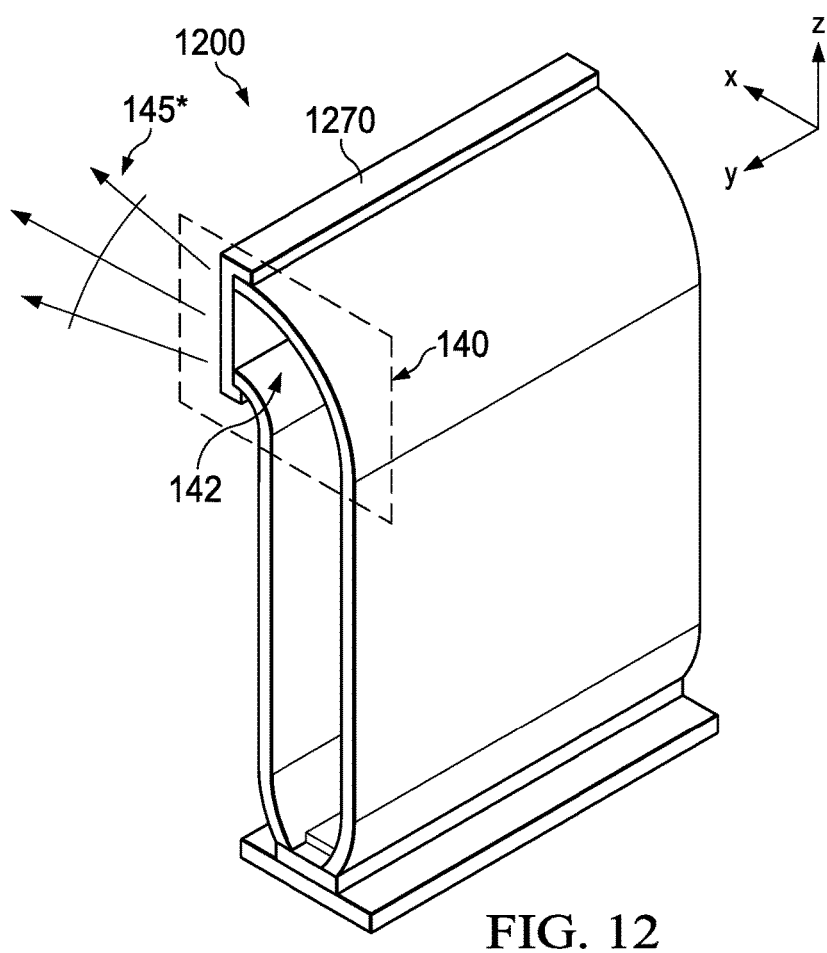
FIG. 12 shows another modification of the hollow luminaire of FIG. 2.

In implementations shown in FIG. 12, the hollow luminaire 1200 includes an endcap diffuser 1270 arranged to extend across the exit aperture 142. The endcap diffuser 1270 is configured to diffuse propagating light into diffused output light. The angular distribution 145* of the diffused output light has a divergence that is smaller than a divergence of the angular distribution 145 of output light by a predetermined value. This is shown with reference to FIGS. 3 and 13, in which the lobe 145*a** of the polar plot 191* corresponding to the diffused light output by the hollow luminaire 1200 is wider than the lobe 145*a* of the polar plot 191 corresponding to the light output by the hollow luminaire 200.

Generally, depending on the implementation, one or more optical elements may be arranged at or near the exit aperture including one or more diffusers, Fresnel optics or other optical elements. Depending on shape, configuration, arrangement and/or other factors, such optical elements can be used in transmission, reflection or by combination in both transmission and reflection. Diffusers can be traditional, holographic or otherwise. Fresnel optics can include Fresnel lenses, various forms of collapsed refractive structures or other optics. Such optical elements may be configured to extend across a portion or all of the exit aperture and alone or in combination with other elements may help enclose the inside of the luminaire. Enclosing the inside of the luminaire may require additional elements such as endcaps or other elements arranged at the exit aperture or elsewhere in the luminaire. Suitably enclosing the inside of a luminaire can help mitigate contamination of optical surfaces, reduce cleaning requirements and prolong useful service life of the luminaire, for example.

In some implementations, the third portion (140 or 740) of the first wall (150-*i* or 750-*i*) intersects a notional linear extension of the second portion (130 or 730) of the second wall (150-*o* or 750-*o*) within the one or more cross-sectional planes. In this manner, it is ensured that there is no line of sight from the exit aperture (142 or 742) to the LEEs (110 or 710).

Figure 6:
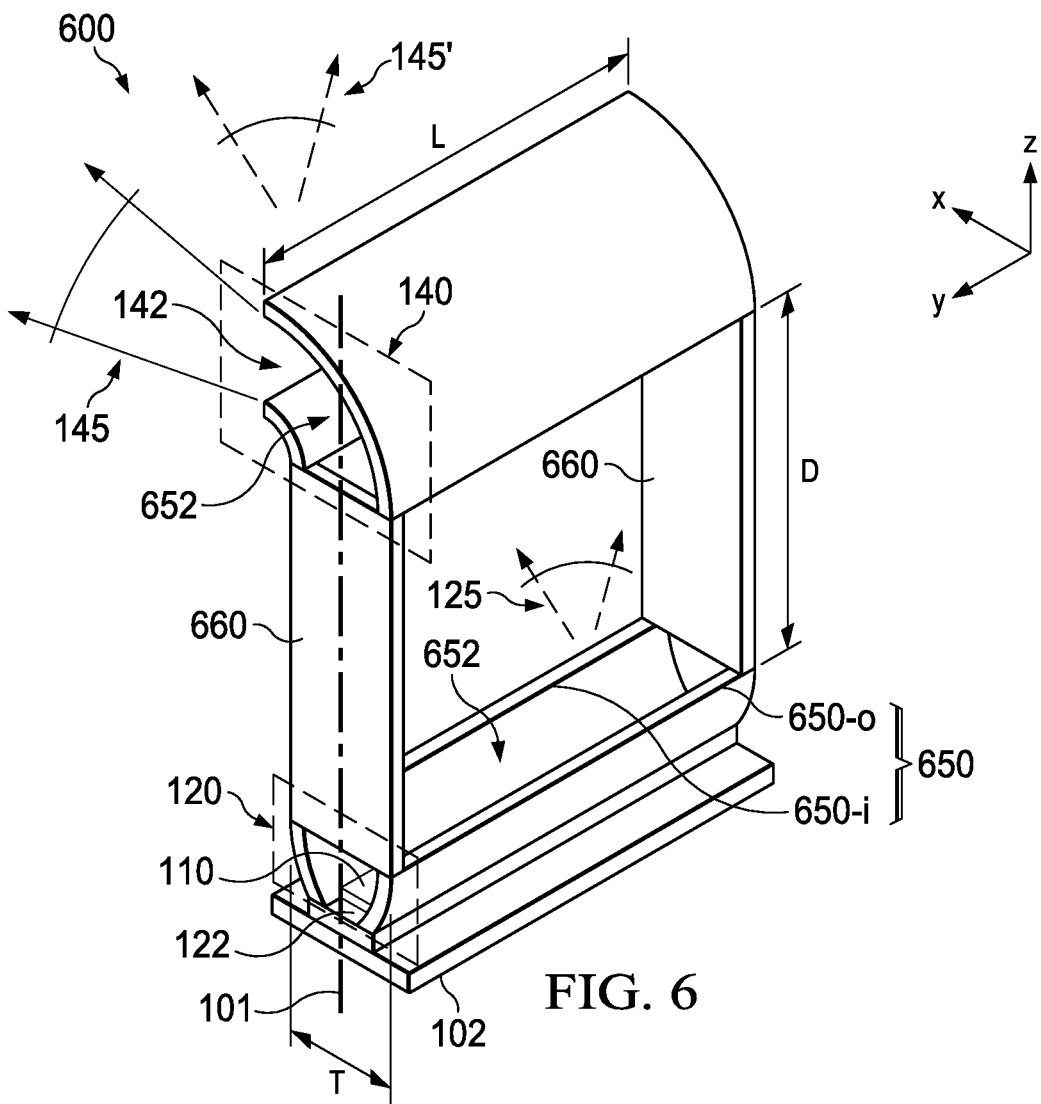
FIG. 6 shows a modification of the hollow luminaire of FIG. 2.
Figure 7A:
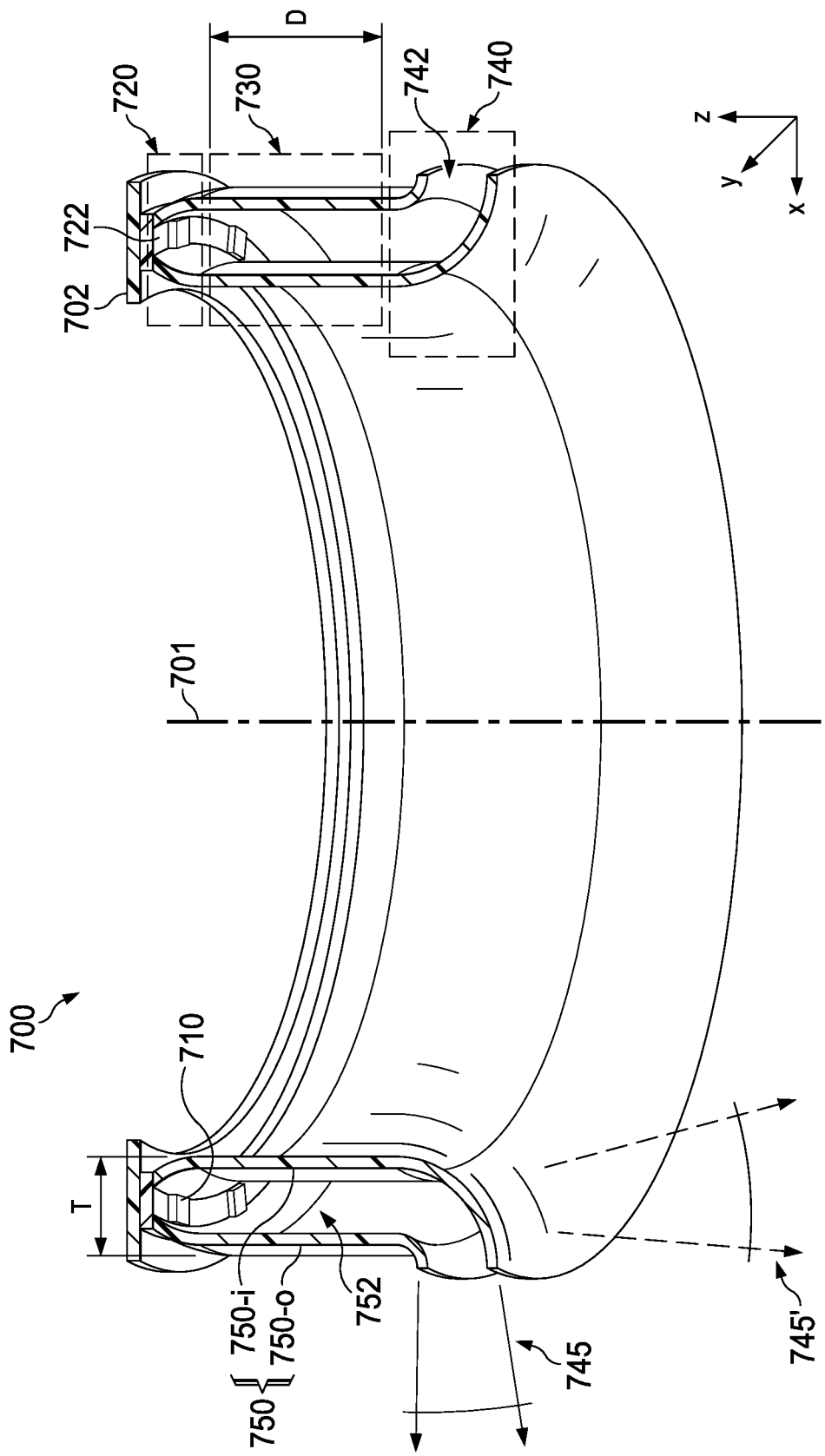
FIGS. 7A-7B show a curved hollow luminaire configured as a pendant for direct/indirect illumination which can be ceiling mounted or partially recessed.
Figure 7B:
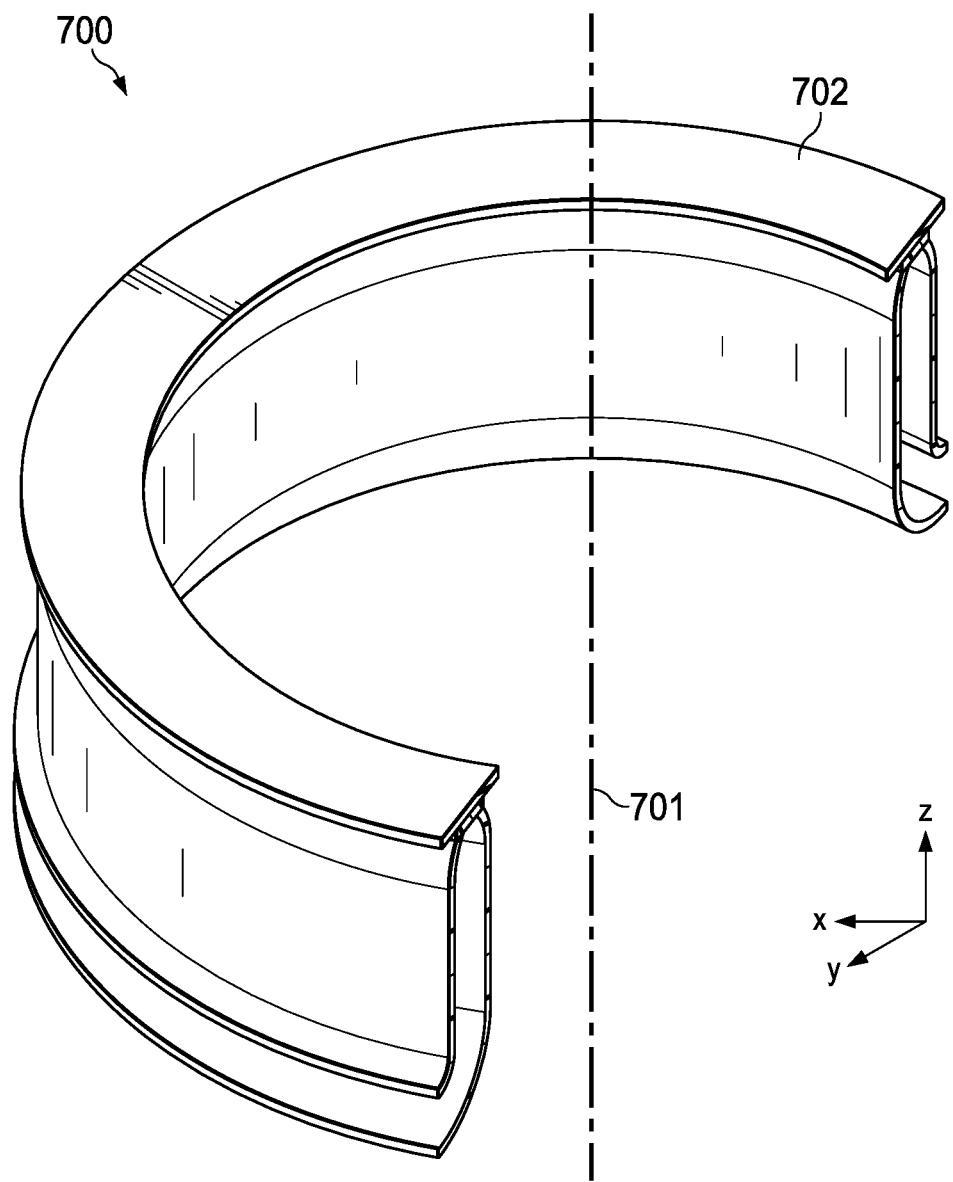

In another innovative aspect (see, e.g., FIG. 6), a hollow luminaire (600), includes multiple light-emitting elements (LEEs) (110), and a first and second walls (650-*i*, 650-*o*) extending along a first direction (e.g., along the axis 101) from first ends proximate the LEEs (110) to second ends. The first and second walls (650-*i*, 650-*o*) have light-reflective surfaces facing each other. The light-reflective surfaces are spaced apart by a hollow channel (652). In a cross-sectional plane parallel to the first direction (e.g., along the axis 101), the light-reflective surfaces of the first and second walls (650-*i*, 650-*o*) have first portions (120) that curve in opposite directions and third portions (140) that curve in like directions. The first portions (120) are arranged proximate the LEEs (110) to provide an input aperture (122) for receiving light from the LEEs (110). The third portions (140) are arranged to provide an exit aperture (142) for outputting light into an ambient environment. Additionally, the first and second walls (650-*i*, 650-*o*) are configured to propagate light from the input aperture (122) to the exit aperture (142).

Note that the first and second walls (650-*i*, 650-*o*) have openings along the first direction, such that the first portions and the second portions are discontiguous, and therefore spaced apart from each other by a distance D. Thus, the hollow channel (652) of this hollow luminaire (600) also is discontiguous. In this manner, light provided by the LEEs (110) through the input aperture (122) propagates from the first portions (120) to the third portions (140) over the distance D through free space. Note that a combination of (I) the curvatures of the first and second walls (650-*i*, 650-*o*) within the first portions (120), (II) the width (T) of the hollow channel (652), and (III) the distance (D) between the first portions (120) and the third portions (140) is configured to ensure that all light provided by the LEEs (110) through the input aperture (122) reaches the third portions (140) through free space.

The light output by hollow luminaire (600) has a far-field light intensity distribution 191 shown in FIG. 3.

The foregoing and other embodiments can each optionally include one or more of the following features, alone or in combination. In the implementations shown in FIG. 6, the hollow luminaire (600) includes support structure (660) that affixes the third portions (140) to the first portions (120) at a desired relative separation and orientation. In some implementations, the hollow luminaire (600) can include an endcap diffuser arranged to extend across the exit aperture 142. Here, the endcap diffuser can be implemented as the endcap diffuser 1270 described in connection with FIG. 12.

In another innovative aspect (see, e.g., FIGS. 1A-1B, 2 or 7A-7B, 8), a hollow luminaire (100, 200 or 700, 800) includes multiple light-emitting elements (110 or 710); and a hollow light guide including a pair of walls (150 or 750) each extending along an axis (101 or 701) of the hollow luminaire (100, 200 or 700, 800) from the light emitting elements (110 or 710) to an exit aperture (142 or 742). A first surface of a first (150-*i* or 750-*i*) of the pair of walls (150 or 750) is separated from the first surface of a second (150-*o* or 750-*o*) of the pair of walls (150 or 750) in a direction orthogonal to the axis (101 or 701) by a channel (152 or 752) along which the hollow light guide directs light from the light emitting elements (110 or 710) to the exit aperture (142 or 742). In cross-section, the walls (150 or 750) define (i) a first portion (120 or 720) extending along the axis (101 or 701) in which the first surfaces of the pair of walls (150 or 750) curve in opposite directions; (ii) a second portion (130 or 730) extending along the axis (101 or 701) following the first portion (120 or 720) in which the first surfaces of the pair of walls (150 or 750) are parallel; and (iii) a third portion (140 or 740) extending along the axis (101 or 701) following the second portion in which the first surfaces of the pair of walls (150 or 750) curve in the same direction. Additionally, the hollow luminaire (100, 200 or 700, 800) includes a base (102 or 702) supporting the plurality of light emitting elements (110 or 710).

The foregoing and other embodiments can each optionally include one or more of the following features, alone or in combination. In some implementations shown in FIGS. 2, 4, 8, 10, 12, the hollow luminaire (200, 400, 800, 1000 or 1200) has a linear form factor. In other implementations shown in FIGS. 1A-1B, 7A-7B, the hollow luminaire (100 or 700) has a curvilinear form factor. In yet other implementations, the disclosed hollow luminaire can have a serpentine form factor.

In implementations similar to the ones shown in FIGS. 1A-1B, 7A-7B, the hollow luminaire can have continuous rotational symmetry about the axis (101 or 701). In other implementations, the disclosed hollow luminaire can have discrete rotational symmetry about the axis (101 or 701).

Figure 13:
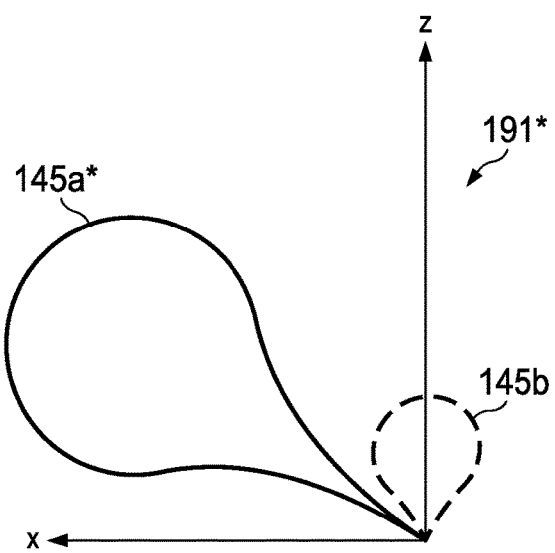
FIG. 13 shows a light intensity distribution for the hollow luminaire of FIG. 12.

In implementations shown in FIGS. 1A-1B, 2, 6, 12, the hollow luminaire (100, 200, 600, 1200) includes walls (150, 650) which have third portions (140) configured to enable operation of the hollow luminaire (100, 200, 600, 1200) as a standing lamp, pedestal, or pendant for indirect illumination via ceiling or wall. Examples of far-field light intensity distributions (191, 191*) of light output by this configuration of the disclosed hollow luminaire (100, 200, 600, 1200) are shown in FIGS. 3, 13.

In implementations shown in FIG. 4, the hollow luminaire (400) includes walls (similar to the walls 150) which have third portions (440) configured to enable operation of the hollow luminaire (400) as a stack light. An example of far-field light intensity distribution (491) of light output by this configuration of the disclosed hollow luminaire (400) is shown in FIG. 5.

In implementations shown in FIGS. 7A-7B, 8, 10, the hollow luminaire (700, 800) includes walls (750) which have third portions (740) configured to enable operation of the hollow luminaire (700, 800) as a pendant for direct/indirect illumination which can be ceiling mounted or partially recessed. An example of far-field light intensity distributions (791) of light output by this configuration of the disclosed hollow luminaire (700, 800) is shown in FIG. 9.

In implementations shown in FIG. 10, the hollow luminaire (1000) includes walls (similar to the walls 750) which have third portions (1040) configured to enable operation of the hollow luminaire (1000) as a wall wash. An example of far-field light intensity distribution (1091) of light output by this configuration of the disclosed hollow luminaire (1000) is shown in FIG. 11.

In each of the above implementations, part of the configuration of the third portion to enable a particular one of the foregoing operations is a configuration of the exit aperture (142, 442, 742, or 1042) to control divergence and direction of emission of the respective hollow luminaire.

In some implementations, the light guide guides light by reflection of light at the first surfaces of the pair of walls (150 or 750). Here, the reflection is one or more of specular reflection, diffuse reflection, or TIR.

In some implementations, the walls (150 or 750) include plastic. In some implementations, the first surfaces of the pair of walls (150 or 750) are metallized.

In some implementations, the disclosed hollow luminaires (100, 200, 400, 600, 700, 800, 1000, 1200) extend along the axis (101, 701) for a length D of 0.1, 0.2, 0.3, 0.5, 1 m. In some implementations, the disclosed hollow luminaires (100, 200, 400, 600, 700, 800, 1000, 1200) are elongated along a path in a plane perpendicular to the axis (101, 701) for an extension L of 0.5, 1, 2, 3, 10 m. In some implementations, the disclosed hollow luminaires (100, 200, 400, 600, 700, 800, 1000, 1200) have hollow channels (152, 752) with a thickness T of 0.005, 0.01, 0.02, 0.03, 0.05 m.

In the implementations described above, within the third portion (140, 740), the first surfaces of the pair of walls (150 or 750) curve in the same direction away from the axis (101, 701). In some implementations, within the third portion (140, 740), the first surfaces of the pair of walls (150 or 750) curve in the same direction such that a surface of inner wall (150-*i* or 750-*i*) is concave and a surface of outer wall (150-*o* or 750-*o*) is convex.

In some implementations, an extension of inner wall (150-*i* or 750-*i*) in third portion (140, 740) is configured to occlude direct light emission from LEEs (110 or 710).

In some implementations, the light emitting elements (110 or 710) include LEDs. Here, the LEDs can include white-light LEDs and/or phosphor coated LEDs.

A number of embodiments are described. Other embodiments are in the following claims.

What is claimed is:

1. A luminaire, comprising:
   multiple light-emitting elements (LEEs);
   a base supporting the LEEs; and
   a first wall and a second wall each extending along a first direction from a respective first end facing the LEEs to a respective second end, the first and second walls having light-reflective surfaces facing each other, the light-reflective surfaces being spaced apart forming a hollow channel;
   wherein, in one or more cross-sectional planes parallel to the first direction, the light-reflective surfaces of the first and second walls have first portions that curve in opposite directions, second portions that are parallel, and third portions that curve in like directions;
   wherein the first portions are arranged facing the LEEs to provide an input aperture that receives light from the LEEs, the third portions are arranged to provide an exit aperture that outputs output light into an ambient environment, and the first and second walls are configured to propagate light from the input aperture to the exit aperture.

2. The luminaire of claim 1, wherein a width of the hollow channel perpendicular to the first direction between the second portions of the first and second walls is uniform.

3. The luminaire of claim 1, wherein the first and second walls extend along a curvilinear path perpendicular to the first direction.

4. The luminaire of claim 3, wherein a width of the hollow channel perpendicular to the first direction between the second portions of the first and second walls is uniform along the curvilinear path.

5. The luminaire of claim 3, wherein the first and second walls have closed tubular shapes, the first wall is nested within the second wall and arranged to provide a hollow channel of uniform width.

6. The luminaire of claim 5, wherein the angular distribution of output light has a prevalent propagation direction that includes an acute or obtuse angle with the first direction.

7. The luminaire of claim 5, wherein all output light propagates in obtuse angles relative to the first direction.

8. The luminaire of claim 1, wherein the first and second walls are configured at least to rotate an angular distribution of light propagating from the input aperture to the exit aperture.

9. The luminaire of claim 1 further comprising a diffuser arranged to extend across the exit aperture.

10. The luminaire of claim 1, wherein the first ends are arranged proximate the LEEs.

11. The luminaire of claim 1, wherein the third portion of the first wall intersects a notional linear extension of the second portion of the second wall within the one or more cross-sectional planes.

12. A luminaire, comprising:
multiple light-emitting elements (LEEs); and
first and second walls extending along a first direction from first ends proximate the LEEs to second ends, the first and second walls having light-reflective surfaces facing each other, the light-reflective surfaces being spaced apart by a hollow channel;
wherein, in a cross-sectional plane parallel to the first direction, the light-reflective surfaces of the first and second walls have first portions that curve in opposite directions and third portions that curve in like directions; and
wherein the first portions are arranged proximate the LEEs to provide an input aperture for receiving light from the LEEs, the third portions are arranged to provide an exit aperture for outputting light into an ambient environment, and the first and second walls are configured to propagate light from the input aperture to the exit aperture.

13. The luminaire of claim 12, further comprising:
a support structure that affixes the third portions to the first portions at a desired relative separation and orientation.

14. The luminaire of claim 12, further comprising:
an endcap diffuser arranged to extend across the exit aperture.

15. A luminaire, comprising:
a plurality of light emitting elements; and
a hollow light guide comprising a pair of walls each extending along an axis of the luminaire from the light emitting elements to an exit aperture, a first surface of a first of the pair of walls being separated from the first surface of a second of the pair of walls in a direction orthogonal to the axis by a channel along which the hollow light guide directs light from the light emitting elements to the exit aperture, wherein, in cross-section, the walls define
a first portion extending along the axis in which the first surfaces of the pair of walls curve in opposite directions,
a second portion extending along the axis following the first portion in which the first surfaces of the pair of walls are parallel, and
a third portion extending along the axis following the second portion in which the first surfaces of the pair of walls curve in the same direction; and
a base supporting the plurality of light emitting elements.

16. The luminaire of claim 15, wherein the luminaire has either a linear form factor or a serpentine form factor.

17. The luminaire of claim 15, wherein the luminaire has either continuous or discrete rotational symmetry about the axis.

18. The luminaire of claim 15, wherein the light guide guides light by reflection of light at the first surfaces of the pair of walls, wherein the reflection is one or more of specular reflection, diffuse reflection, or TIR.

19. The luminaire of claim 15, wherein the exit aperture is configured to control divergence and direction of emission of the luminaire.

20. The luminaire of claim 15, wherein, within the third portion, the first surfaces of the pair of walls curve in the same direction away from the axis.

21. The luminaire of claim 15, wherein, within the third portion, the first surfaces of the pair of walls curve in the same direction such that a surface of the inner one of the walls is concave and a surface of the outer one of the walls is convex.

22. The luminaire of claim 15, wherein an extension of the inner one of the walls in the third portion is configured to occlude direct light emission from LEEs.

23. The luminaire of claim 15, wherein the light emitting elements comprise LEDs.

24. The luminaire of claim 23, wherein the LEDs comprise white-light LEDs and/or phosphor coated LEDs.

* * * * *